Feb. 2, 1943.   E. L. HARDER   2,310,076
SIGNALING SYSTEM
Filed March 5, 1940   2 Sheets-Sheet 1
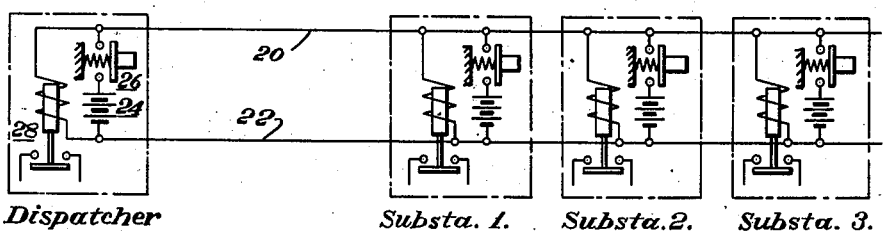
Fig. 1.
Dispatcher   Substa. 1.   Substa. 2.   Substa. 3.
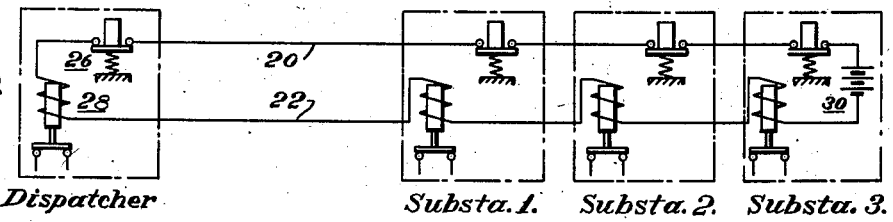
Fig. 2.
Dispatcher   Substa. 1.   Substa. 2.   Substa. 3.
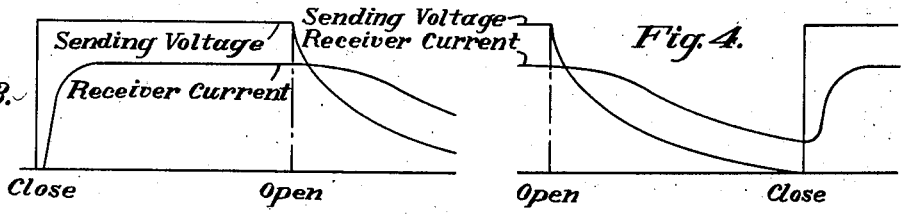
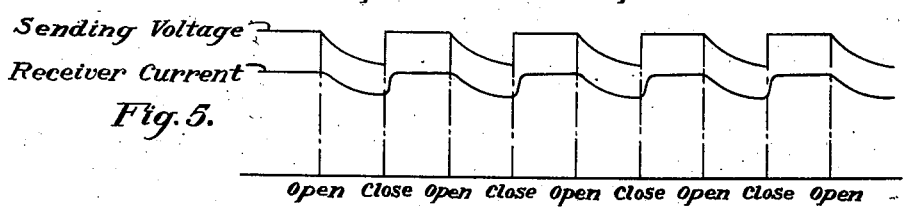
Fig. 5.
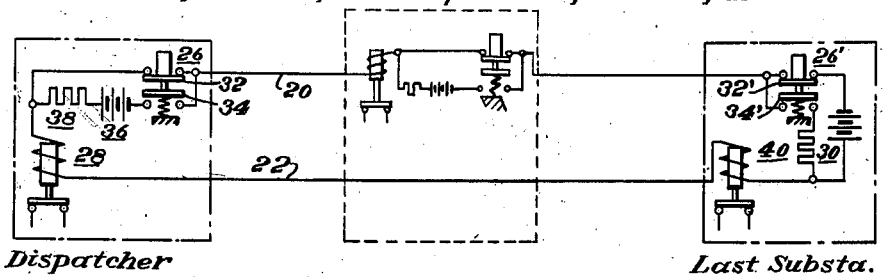
Fig. 6.
Dispatcher   Last Substa.
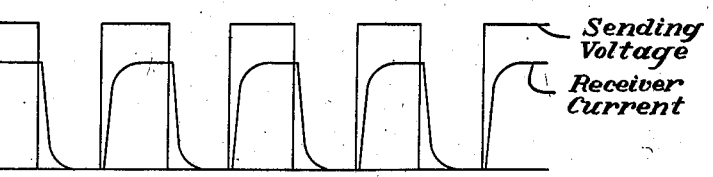
Fig. 7.
WITNESSES:
Edward Michaels
Joe Weber
INVENTOR
Edwin L. Harder.
BY
ATTORNEY Feb. 2, 1943.    E. L. HARDER    2,310,076
SIGNALING SYSTEM
Filed March 5, 1940    2 Sheets-Sheet 2

WITNESSES:
Edward Michaels
Joe Weber

INVENTOR
Edwin L. Harder.
BY
ATTORNEY

Patented Feb. 2, 1943

2,310,076

UNITED STATES PATENT OFFICE 2,310,076

SIGNALING SYSTEM

Edwin L. Harder, Forest Hills, Pa., assignor to Westinghouse Electric & Manufacturing Company, East Pittsburgh, Pa., a corporation of Pennsylvania Application March 5, 1940, Serial No. 322,301

2 Claims. (Cl. 177—353)

My invention relates, generally, to signaling systems, and more particularly, to control systems for remote signaling, supervisory control, metering, and the like.

In the operation of remote signaling, control, metering, and supervisory systems, selection and control of the various elements of the system are obtained by applying codes to the line conductors. These codes comprise a series of electrical impulses applied to the line by alternately connecting and disconnecting the battery, at the station from which the codes are sent, to and from the line, or by opening and closing the line battery at a remote substation.

Where the distances over which the codes are sent are very long, the distributed constants of the line such as resistance, inductance, capacitance, and leakance cause attenuation, distortion, reflection and absorption of the impulse current, so that the final steady state of the line current requires an appreciable time interval and the amplitude of the received impulse is considerably less than that of the impulse as originally applied to the line.

Considerable time is consumed in transmitting the selecting and control codes when such attenuation and distortion occurs because of the time required for each impulse to reach the steady state, since the spacing between impulses must be sufficient to permit such a variation of the line current when the line is deenergized as to cause the line relays to respond to the individual coding impulse.

Therefore, it is the object of my invention, generally stated, to provide a control system for remote signaling, control, metering, and supervisory systems which shall function to so control the coding impulses as to permit increased speed of effective coding.

Another object of the invention is to provide signaling systems which are operated by coded impulses with impulsing means which shall function to apply the coding impulses to the line conductors in such manner as to compensate for the effects of the distributed constants of the line on the code impulses, whereby the available voltage change of the pulses may be fully utilized, and the maximum current change for a given pulsing speed may be obtained at the receiver end of the line.

A further object of the invention is to provide a drain system for a remote signaling system which shall function in combination with the elements of the control system to prevent undesired effects on the signaling system from undesirable induced voltages, such as from parallel power lines.

Another object of the invention is to provide an improved remote control system which shall be simple and efficient in operation and which shall be inexpensive to manufacture, install, operate and maintain.

These and other objects and advantages of the invention will be apparent from the following detailed description taken in connection with the accompanying drawings, in which identical or similar reference characters designate corresponding elements and in which:

Figures 1 and 2 are diagrammatic views of parallel and series connected remote signaling systems, respectively, which have previously been employed for coded impulse control.

Figs. 3 and 4 are graphical illustrations of the nature of the coding impulses as they are applied to the line and as they are received in the systems of Figs. 1 and 2, respectively;

Fig. 5 is a graphical illustration of the nature of a series of closely spaced coding impulses as they are applied to the line and as they are received in the system of Figs. 1 and 2;

Fig. 6 is a diagrammatic view of a series connected remote control system embodying the principal features of a preferred embodiment of my invention;

Fig. 7 is a graphical illustration of the nature of a series of closely spaced coding impulses as they are applied to the line and as they are received in the system of Fig. 6;

Figure 8:
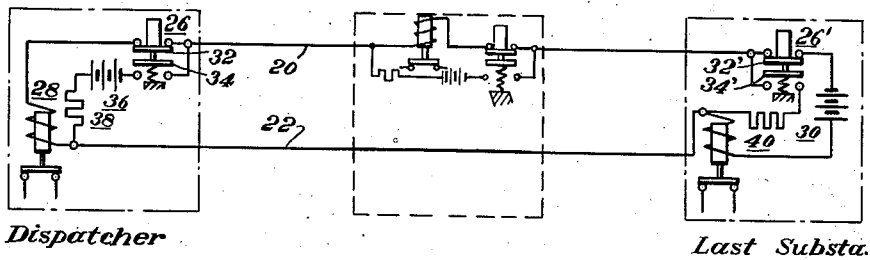
Figs. 8, 9, 10, 11 and 12 are diagrammatic views of other embodiments of the invention.

In practicing the invention, I provide, in the several embodiments of the invention, means for quickly reducing the current flow in the line conductors at the end of each line energizing period in the coding impulse cycle. This quick reduction of the current acting on the receiving relays causes them to release quickly after each impulse, thus conditioning them for the next succeeding impulse more quickly. Thus there is provided a maximum speed of impulsing and a maximum current variation for each impulse.

In one embodiment of the invention, the means for controlling the coding impulses is combined with a drain system for dividing interference voltages induced from neighboring power lines and draining them to ground in such a manner as to prevent these interfering induced voltages from affecting the receiving relays of the control system.

Referring to the drawings for a more detailed explanation of the invention, Figure 1 shows diagrammatically a parallel-connected system of remote signaling comprising a dispatching station as indicated, and line conductors 20 and 22 extending between the dispatching station and a plurality of sub-stations containing apparatus which is to be controlled, supervised and the like. The apparatus at the sub-stations is essentially the same as that at the dispatching station, which comprises a battery 24 connected in a circuit across the line conductors 20 and 22 to be controlled by a suitable circuit control device 26. A line relay 28 is connected across the line conductors 20 and 22, is responsive to impulses applied to the line conductors, and selectively controls signaling apparatus, supervisory apparatus, metering apparatus, and the like, in accordance with the coded impulses which actuate it.

The circuit control or coding device 26 may be any suitable means for controlling the battery circuit, such as the usual contact element of the coding device commonly employed in supervisory control systems.

In the operation of this system, the impulses are applied to the line by closing and opening the coding control device 26 and the line relays in the dispatching station and the several sub-stations respond to the impulses thus supplied to the line.

The signaling system shown in Fig. 2 is a commonly employed series circuit system in which a battery 39 at one of the sub-stations is connected in series circuit relation with the coding contact elements and the line relays at the several stations and the line conductors extending between the stations. In this system, the coding control device 26 is normally in closed circuit position and the several relays are normally energized. The impulses are applied to the line by alternately opening and closing the control device 26.

The resultant voltages applied to the line conductors 20 and 22 and the resultant receiver currents acting upon the line relays at the several sub-stations are illustrated by the graphs of Figs. 3 and 4, which illustrate the conditions obtaining in the parallel and series circuits, respectively, when the coding contact device is actuated. It will be seen from Fig. 3 that the receiver current will build up quickly when the line is energized, and will die down slowly when the line is deenergized. The same condition obtains in the series circuit as illustrated by Fig. 4 except that the individual coding impulses are produced by first opening and then closing the line circuit.

In Fig. 5 there are shown the sending voltage and receiver current conditions when a plurality of spaced impulses are applied to the line in either the series or parallel system. It will be seen from Fig. 5 that, because of the slow decrease of the line current due to the distributed constants of the line, there is only a small variation in the amplitude of the line current when the coding impulses are closely spaced, thus making it necessary to space the coding impulses a very considerable amount in order to provide sufficient variation in line current to selectively operate the relays. This extra spacing of the coding impulses requires a longer period of time to transmit a given code or a given number of impulses, thus slowing up the operation of selectively controlling apparatus at the remote station.

In Fig. 6 there is shown a series of signaling system embodying the principal features of the invention. Here, as in the system of Fig. 2, the coding control device 26 and the line relay 28, are provided at the dispatcher's station and similar elements are provided at the intermediate stations and the last sub-station. The coding control device 26 at the dispatcher's station has a back contact 32 which normally completes the series signaling circuit, and in addition, has a front contact 34 which controls an alternative circuit to be connected in the series circuit comprising a battery 36 and a resistor 38. The battery 36 is connected in opposed polarity relation with the battery 30 at a remote sub-station, so that when the coding control device 26 is actuated, a potential will be applied in a series circuit substantially equal and opposite in direction to the potential applied to the line by the normally connected battery 30 at the last sub-station, or any intermediate sub-station. This application of the opposing polarity in the series circuit will have the effect of neutralizing the charge on the line and causing the line current to be reduced very quickly. When the coding control device 26 is again released to move its contact element 32 to closed circuit position, and its contact element 34 to open circuit position, the line will again be quickly energized by the battery 30. This quick energization and deenergization of the line at the beginning and end of each of the line energization periods will result in a series of coding impulses having characteristics illustrated in Fig. 7. It will be seen from Fig. 7 that, with substantially the same spacing as the coding impulses of Fig. 5, there is a much greater variation of line current for each coding impulse, thus resulting in a much more positive selective actuation of the line relays at the several sub-stations.

When signaling impulses are sent from the last sub-station or a remote sub-station on the system of Fig. 6 the circuit of the battery 30 is opened by actuating the coding control device 26' to move its contact element 32' to open circuit position. This moves the contact element 34' of the coding control device 26' to closed circuit position, closing a circuit to connect a resistor 40 across the line conductors 20 and 22. This operation deenergizes the line conductors and connects the resistor 40 to quickly drain the charging current from the line, thus insuring a quick decrease of the line current when the line is deenergized.

The signaling system of Fig. 8 is similar to that of Fig. 6, with the exception that the resistors 38 and 40 are shunted around their associated line relays, thus supplying the neutralizing voltage at the dispatcher's station directly to the line without having to pass it through the winding of the line relay 28, and resulting in a larger line current because of the reduction of the effective resistance of the complete series circuit or the elimination of the winding of the relay 28 from the series circuit. The resistors 38 and 40 shown in Fig. 6 are provided for preventing a short circuit of the batteries 36 and 30 in the event that the contact elements 32 and 34 of the coding control device 26 or the corresponding contact elements of the control device 26' should happen to be closed at the same time.

Figure 9:
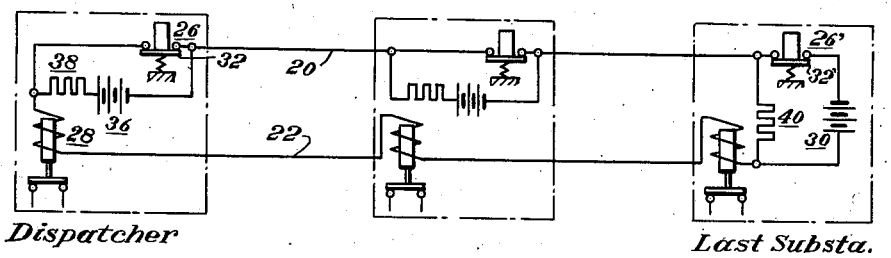

In Fig. 9 there is illustrated a series signaling circuit in which the apparatus in the dispatcher's station comprises a coding control device 26 having only a back contact element 32, and the circuit control device is shunted by a circuit comprising a battery 36 and a resistor 38. The apparatus at the last sub-station or a remote sub-station, is similar to that of Fig. 2, except that a shunting circuit comprising a resistor 40, is permanently connected across the line conductors 20 and 22. In this system, there is always a circulating current through the battery at each of the stations, and when the coding control device is actuated to open circuit position, the potential of the battery 36 opposes the potential of the battery 30 to thereby quickly reduce the line current. At the last or remote sub-station, the line is deenergized by actuating the circuit control device 26' to remove the potential of the battery 30 from the line conductors and to permit the charging current on the line conductors to be dissipated through the resistor 40.

Figure 10:
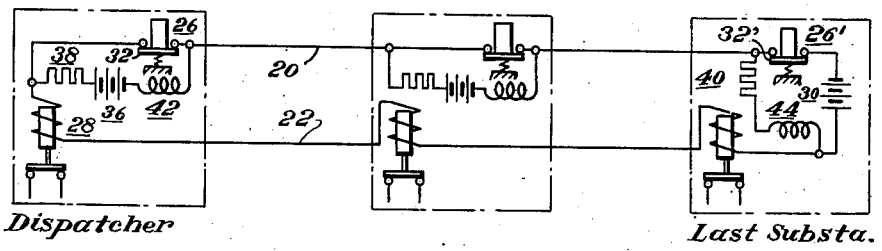

The system of Fig. 10 is similar to that of Fig. 9, with the exception that an inductor 42 is connected in series with the battery 36 and resistor 38 at the dispatcher's station and at intermediate stations, and an inductor 44 is connetced in series circuit with the resistor 40 at the last or remote sub-station. In this embodiment of the invention, there will be a continuous charging current on the inductors 42 and 44, which will assist in bucking down the line current when the circulating current through the inductor is interrupted by the circuit control device 26.

Figure 11:
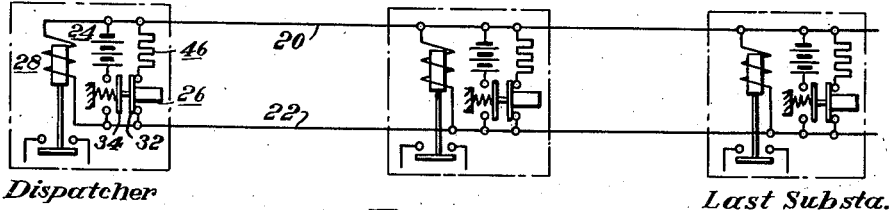

A system for quickly reducing the line current at the end of the line energization period of the coding impulse cycle for a parallel connected system, is shown in Fig. 11. The apparatus at the several sub-stations is substantially identical with that at the dispatcher's station, which comprises the line relay connected across the line, a circuit control device 26 for controlling the coding impulses having a back contact element 32 which completes a circuit across the line conductors 20 and 22 through a resistor 46, and a front contact element 34 which completes a circuit across the line conductors 20 and 22 through a battery 24. In the operation of this system, the line conductors are energized by completing the circuit of the battery 24, and the charging current of the line is quickly dissipated at the end of the line energizing period through the resistors 46 at the several stations.

Figure 12:
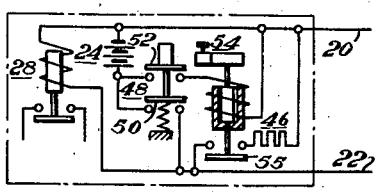

In order to prevent the constant drain on the line which would be occasioned by the continuous connection of the resistors 46 at the several stations across the line, the system of Fig. 12 is provided. In this system, a coding control device 48 for controlling the coding impulses having front contact elements 50 and 52, is provided. The front contact element 50 controls a circuit connecting the battery 24 across the line conductors 20 and 22. The front contact element 52 connects the winding of a relay 54 to be energized by the battery 24. The relay 54 is a slow-pickup, slow-release relay having a contact element 55 connected to complete a circuit across the line conductors 20 and 22 through a resistor 46. In the operation of this system, when the coding impulse control device 48 is actuated, the line conductors are energized by the battery 24 and by suitably adjusting the relay 54, it is caused to connect the resistor 46 across the line conductors 20 and 22 at substantially the instant of deenergization of the line conductors by release of the impulse control device 48. The relay 54 is also timed to retain the connection of the resistor 46 across the line conductors 20 and 22 for an interval sufficient to discharge the charging current on the line conductors 20 and 22 through the resistor 46. Thus, the resistor 46 is connected to the line conductors 20 and 22 only at the time that it is desired to provide a quick discharge path for the charging current of the line conductors 20 and 22. At all other times, the resistor 46 at the station which is sending the coding impulses, is disconnected from the line conductors and the resistor 46 at each of the other stations is disconnected from the line, except during the line discharge period of the coding impulse while the coding is being done from that station.

Figure 13:
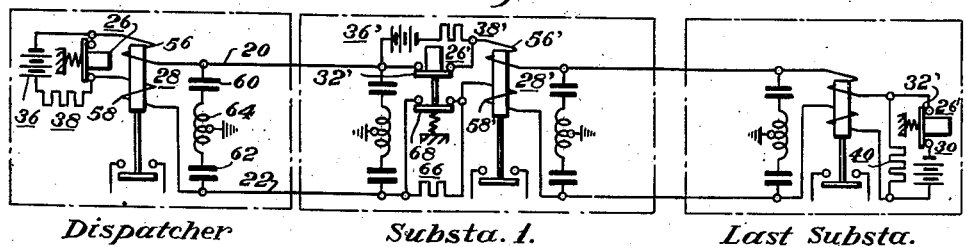
Fig. 13 is a diagrammatic view of a remote control system combined with an interference drain system embodying the principles of the invention.

In Fig. 13, there is shown a series circuit signaling system combined with a system for neutralizing interfering potentials induced in the signaling system line conductors and draining the current due to these induced potentials from the line without interfering with the operation of the signaling system. A unit for draining these interference potentials and currents from the line is connected adjacent each side of the intermediate sub-stations and on the line side of the dispatcher's station, and the last sub-station. These units may comprise condensers 60 and 62 and an inductor 64, the inductor 64 having a grounded central connection. The condensers 60 and 62 and the inductor 64 are connected across the line circuit as indicated, and the connections from ground to each of the line conductors have such a ratio of inductance and capacitance as to be responsive to the frequency of the interfering induced potentials, such as the 60-cycle frequency of adjacent power lines. This drainage circuit extending across the conductors, however, will prevent the coding impulses and the induced interfering potentials from being passed from one line to the other through the drain. Since the interfering potentials are induced in the same direction in each of the line conductors 20 and 22, it will be seen that they will flow along the line conductors and through the drain devices to ground and only a small proportion of the currents thus induced in the signaling line conductors will pass through the line relays. However, to prevent these interfering currents from effecting the line relays, the line relays are each provided with two windings 56 and 58, which are so related to each other as to actuate the line relays when normal series signaling circuit current is flowing through them, but to oppose each other and thus prevent actuation of the relay when induced interfering currents of equal magnitude are flowing in the same direction in the line conductors. This division of the windings of the line relays between the two line conductors also tends to balance the impedances of the line conductor circuits, so as to insure that substantially equal induced interfering currents will flow in the two line conductors.

The coding impulse applying means of this system is similar to that of Fig. 9, and, at intermediate stations, in order to maintain the balance of the impedances of the two line conductors 20 and 22, a resistor 66 is connected to be made a part of the series circuit by a back contact element 68 on the coding control device 26' when the battery 36' and the resistor 38' are connected in the series circuit to effect a quick decrease of the signaling line current.

Thus it will be seen that I have provided a signaling system which shall function to so control the coding impulses as to permit increased speed of effective coding by effecting a quick decrease of the line current at the end of the line energization period of the coding impulses, and which functions to prevent interference of undesirable induced voltages on the line conductors of the signaling system with the signaling operations.

In compliance with the requirements of the patent statutes, I have shown and described herein the preferred embodiments of my invention. It is to be understood, however, that the invention is not limited to the precise constructions shown and described, but is capable of modification by one skilled in the art, the embodiments of the invention shown herein being merely illustrative of the principles of the invention.

I claim as my invention:

1. In a signaling system having a plurality of stations and line conductors extending therebetween; a main source of direct-current power; line relays at certain of the stations; means connecting said source of power, all of said line relays and the line conductors in series circuit relation; and means at each of certain of the stations for applying impulses to the series circuit comprising a circuit interrupter connected in the series circuit, and a shunting circuit for said interrupter comprising an auxiliary source of direct-current power, a resistor and an inductor connected in series circuit relation, said auxiliary source of power being connected in opposed polarity relation with said main source of power.

2. In a signaling system having a plurality of stations and line conductors extending therebetween; a main source of direct-current power; line relays at certain of the stations; means connecting said source of power, all of said line relays and the line conductors in series circuit relation; and means at each of certain of the stations for applying impulses to the series circuit comprising a circuit interrupter connected in the said series circuit, a shunting circuit for said interrupter comprising an auxiliary source of direct-current power, a resistor and an inductor connected in series circuit relation, said auxiliary source of power being connected in opposed polarity relation with said main source of power; and means adjacent said main source of power for applying impulses to the series circuit comprising a circuit interrupter connected in the series circuit adjacent said main source of power and a resistor and an inductor connected in shunting relation with the part of the series circuit comprising said main source of power and the associated interrupter.

EDWIN L. HARDER.